(12) United States Patent
Chegini et al.

(10) Patent No.: US 11,868,703 B2
(45) Date of Patent: *Jan. 9, 2024

(54) SYSTEM AND METHOD FOR DYNAMIC LINKING BETWEEN GRAPHIC DOCUMENTS AND COMMENT DATA BASES

(71) Applicant: E-PLAN, INC., Ivine, CA (US)

(72) Inventors: Michael Chegini, Newport Coast, CA (US); Steven Hooper, Mission Viejo, CA (US); S. Jay Hedjazi, Laguna Hills, CA (US)

(73) Assignee: E-PLAN, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,345

(22) Filed: Feb. 8, 2023

(65) Prior Publication Data

US 2023/0289512 A1 Sep. 14, 2023

Related U.S. Application Data

(63) Continuation of application No. 17/657,099, filed on Mar. 29, 2022, now Pat. No. 11,580,293, which is a
(Continued)

(51) Int. Cl.
| | |
|---|---|
| *G06F 16/955* | (2019.01) |
| *G06F 40/134* | (2020.01) |
| *G06F 16/958* | (2019.01) |
| *G09G 5/14* | (2006.01) |
| *G06F 3/04812* | (2022.01) |

(52) U.S. Cl.
CPC ........ *G06F 40/134* (2020.01); *G06F 3/04812* (2013.01); *G06F 16/958* (2019.01); *G09G 5/14* (2013.01); *Y10S 707/99933* (2013.01)

(58) Field of Classification Search
None
See application file for complete search history.

(56) References Cited

U.S. PATENT DOCUMENTS

| | | |
|---|---|---|
| 4,964,060 A | 10/1990 | Hartsog |
| 5,444,843 A | 8/1995 | Nilsson et al. |

(Continued)

OTHER PUBLICATIONS

Results of www.google.com/patents by Applicant Mar. 16, 2007.

*Primary Examiner* — Maikhanh Nguyen
(74) *Attorney, Agent, or Firm* — Knobbe, Martens, Olson & Bear LLP

(57) ABSTRACT

A method for dynamic linking between graphic documents and comment databases is described and includes entering a base graphic representation of a project in a computer system. The base graphic representation may be the conversion of a user supplied format graphic to a web support format graphic. A coordinate overlay grid of a coordinate overlay program may be linked to the base graphic representation for overlay positioning and display on the base graphic representation. The coordinate overlay program may have a notation subprogram linked to the coordinate overlay grid for a user to designate notation with an identifier relative to a distinct location of the base graphic representation on the coordinate overlay grid. A text or graphic comment data record may be entered in a comment data record referenced to an identifier and displayed using a computer cursor device and display to activate an identifier.

21 Claims, 1 Drawing Sheet

Related U.S. Application Data continuation of application No. 17/451,216, filed on Oct. 18, 2021, now Pat. No. 11,295,066, which is a continuation of application No. 16/871,925, filed on May 11, 2020, now Pat. No. 11,210,451, which is a continuation of application No. 16/506,138, filed on Jul. 9, 2019, now Pat. No. 10,657,314, which is a continuation of application No. 16/259,335, filed on Jan. 28, 2019, now abandoned, which is a continuation of application No. 15/655,787, filed on Jul. 20, 2017, now Pat. No. 10,198,407, which is a continuation of application No. 14/084,323, filed on Nov. 19, 2013, now Pat. No. 9,720,886, which is a continuation of application No. 13/173,844, filed on Jun. 30, 2011, now Pat. No. 8,595,617, which is a continuation of application No. 11/900,479, filed on Sep. 11, 2007, now Pat. No. 7,975,222.

(56) References Cited

U.S. PATENT DOCUMENTS

| | | |
|---|---|---|
| 5,524,202 A | 6/1996 | Yokohama |
| 5,860,074 A | 1/1999 | Rowe |
| 5,918,219 A | 6/1999 | Isherwood |
| 5,950,206 A | 9/1999 | Krause |
| 6,092,050 A | 7/2000 | Lungren et al. |
| 6,393,410 B1 | 5/2002 | Thompson |
| 6,446,053 B1 | 9/2002 | Elliott |
| 6,466,953 B1 | 10/2002 | Bonney |
| 6,581,040 B1 | 6/2003 | Wright et al. |
| 6,922,701 B1 | 7/2005 | Ananian |
| 7,042,468 B2 | 5/2006 | Schwegler |
| 7,062,514 B2 | 6/2006 | Harris |
| 7,174,339 B1 | 2/2007 | Wucherer |
| 7,257,771 B2 | 8/2007 | Buser |
| 7,283,975 B2 | 10/2007 | Broughton |
| 7,409,392 B2 | 8/2008 | Greer |
| 7,466,334 B1 | 12/2008 | Baba |
| 7,567,844 B2 | 7/2009 | Thomas |
| 7,958,185 B2 | 6/2011 | Rothermel |
| 7,975,222 B1 | 7/2011 | Chegini |
| 8,509,535 B2 | 8/2013 | Hartmann |
| 8,595,617 B2 | 11/2013 | Chegini |
| 8,990,049 B2 | 3/2015 | Plocher |
| 9,135,602 B2 | 9/2015 | Chegini |
| 9,684,643 B2 | 6/2017 | Chegini |
| 2001/0047251 A1 | 11/2001 | Kemp |
| 2002/0013933 A1 | 1/2002 | Shiba |
| 2002/0035451 A1 | 3/2002 | Rothermel |
| 2002/0198755 A1 | 12/2002 | Birkner |
| 2003/0052877 A1 | 3/2003 | Schwegler |
| 2003/0101127 A1 | 5/2003 | Cornelius |
| 2003/0187932 A1 | 10/2003 | Kennedy |
| 2004/0024623 A1 | 2/2004 | Ciscon |
| 2004/0117361 A1 | 6/2004 | Greer et al. |
| 2004/0161150 A1 | 8/2004 | Cukierman |
| 2004/0215633 A1 | 10/2004 | Harris |
| 2004/0225968 A1 | 11/2004 | Look |
| 2005/0268228 A1 | 12/2005 | Buser |
| 2005/0270311 A1 | 12/2005 | Rasmussen |
| 2006/0085322 A1 | 4/2006 | Crookshanks |
| 2006/0085747 A1 | 4/2006 | Morgan |
| 2006/0107203 A1 | 5/2006 | Schilling et al. |
| 2006/0174239 A1 | 8/2006 | Dietsch |
| 2006/0242419 A1 | 10/2006 | Gaffey |
| 2007/0055926 A1 | 3/2007 | Christiansen et al. |
| 2007/0061774 A1 | 3/2007 | Chan |
| 2007/0112860 A1 | 5/2007 | Ostanik |
| 2007/0118795 A1 | 5/2007 | Noyes |
| 2007/0226606 A1 | 9/2007 | Noyes et al. |
| 2007/0244671 A1 | 10/2007 | Lyangar |
| 2007/0255725 A1 | 11/2007 | McCoach |
| 2008/0059220 A1 | 3/2008 | Roth et al. |
| 2008/0084333 A1 | 4/2008 | Forrest |
| 2009/0048899 A1 | 2/2009 | Bender |
| 2009/0204465 A1 | 8/2009 | Pradhan |
| 2009/0273598 A1 | 11/2009 | Reghetti |
| 2010/0185547 A1 | 7/2010 | Scholar |
| 2010/0313114 A1 | 12/2010 | Colbran |
| 2011/0078169 A1 | 3/2011 | Sit |
| 2011/0145691 A1 | 6/2011 | Noyes |
| 2011/0145692 A1 | 6/2011 | Noyes |
| 2011/0176179 A1 | 7/2011 | Judelson |
| 2011/0302506 A1 | 12/2011 | Noyes |
| 2012/0050332 A1 | 3/2012 | Nikara et al. |
| 2012/0065944 A1 | 3/2012 | Nielsen |
| 2013/0024452 A1 | 1/2013 | Defusco |
| 2014/0019148 A1 | 1/2014 | Buzz |
| 2014/0033069 A1 | 1/2014 | Chegini |
| 2015/0062123 A1 | 3/2015 | Yuen |
| 2015/0106091 A1 | 4/2015 | Wetjen et al. |
| 2016/0239584 A1 | 8/2016 | Steele, Jr. |
| 2017/0052680 A1 | 2/2017 | Chegini |

SYSTEM AND METHOD FOR DYNAMIC LINKING BETWEEN GRAPHIC DOCUMENTS AND COMMENT DATA BASES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

This invention relates to methods for use in managing construction projects for building structures, civil and public works projects, constructing manufacturing facilities, and for building products, such as, ships, land and air vehicles, and the like. The method may use a project plan review system implemented on a computer system with a program that may allow linking or integration of text and graphic documents such as drawings. The new method may allow efficient reviewer, designer and owner collaboration through a world wide web system based interactive system that may only require use of a standard web browser by a user.

Current industry practice for review and comment documentation may be to use EXCEL spreadsheets and manual markup and scans of graphic documentation or electronic mark up programs that may require installation of proprietary program software on a user's system. These systems may require inefficient, manual correlation of review documentation records and the subject graphic documents.

SUMMARY OF THE INVENTION

The present invention is directed toward methods for dynamic linking between graphic documents and comment data bases. A base graphic representation of a project may be entered in a computer system. The base graphic representation may be the conversion of a user supplied format graphic to a web support format graphic. A coordinate overlay grid of a coordinate overlay program may be linked to the base graphic representation for overlay positioning and display on the base graphic representation when displayed on a computer display viewport. The coordinate overlay program may have a text or graphic notation subprogram linked to the coordinate overlay grid for a user to designate notation with an identifier relative to a distinct location of the base graphic representation on the coordinate overlay grid. A text or graphic comment data record may be entered in a comment data record referenced to an identifier. The text or graphic comment data record may be accessed and displayed using a computer cursor device and display to activate an identifier. Also a text or graphic comment data record of a base graphic representation may be accessed and displayed by a comment data record database review related to a base graphic representation.

These and other features, aspects and advantages of the present invention will become better understood with reference to the following drawings, description and claims.

DETAILED DESCRIPTION OF THE PREFERRED EMBODIMENT

The following detailed description represents the best currently contemplated modes for carrying out the invention. The description is not to be taken in a limiting sense, but is made merely for the purpose of illustrating the general principles of the invention.

Figure 1:
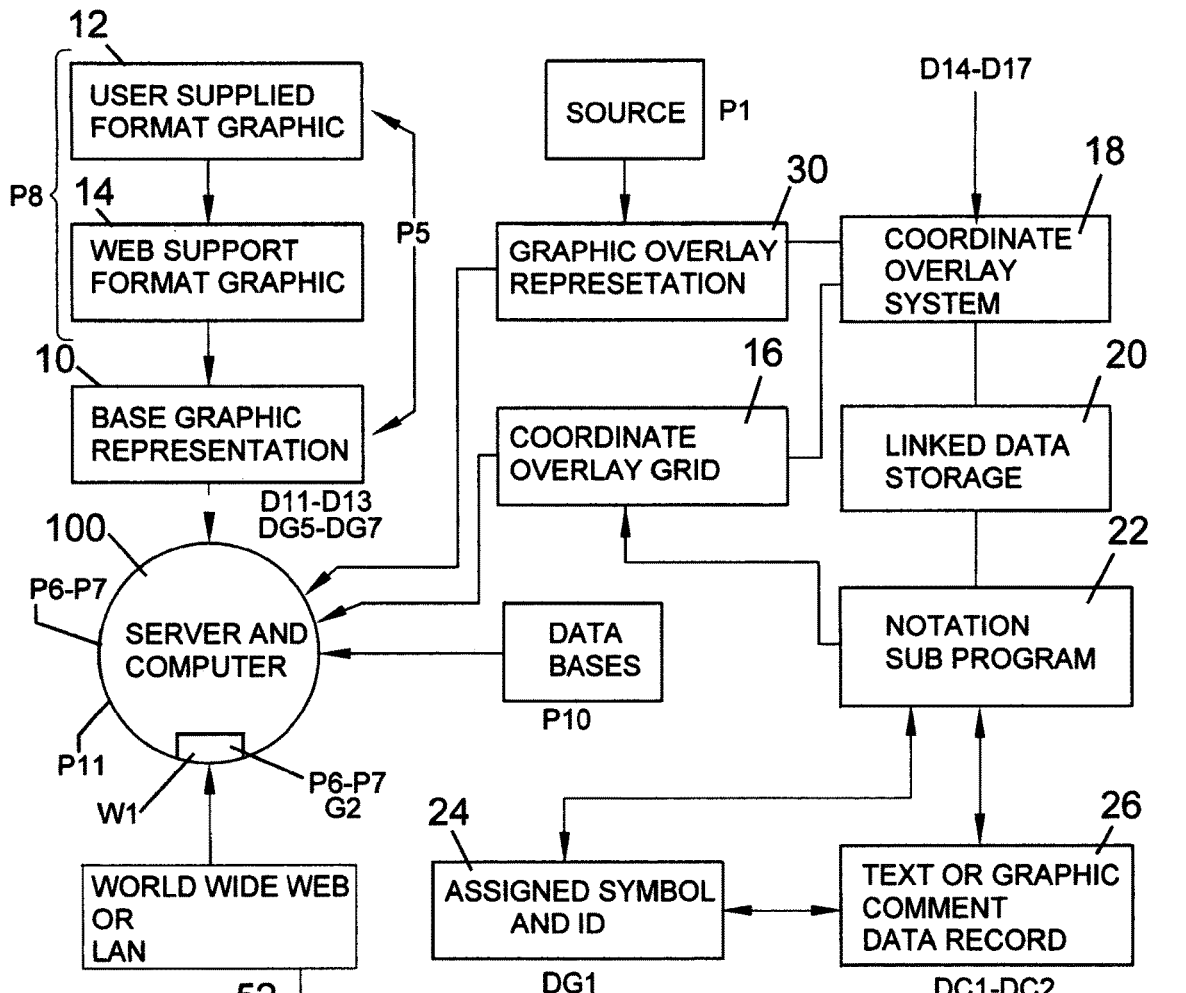
FIG. 1 illustrates a functional block diagram of a computer system according to an embodiment of the invention.
Figure 2:
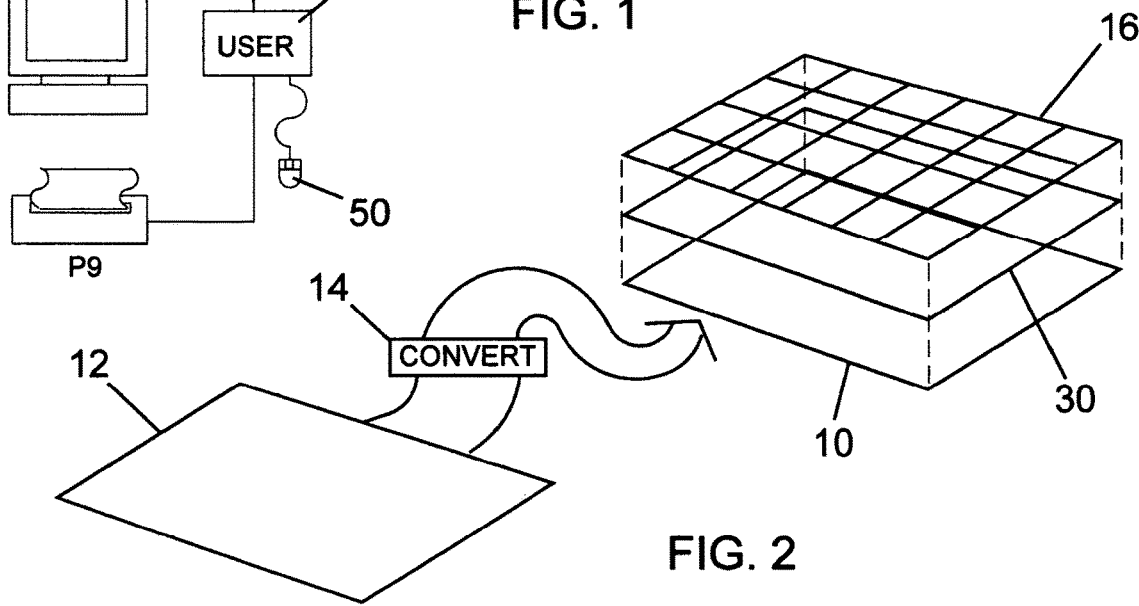
FIG. 2 illustrates a flow diagram of a plan review method according to an embodiment of the invention.

Referring to FIGS. 1 and 2, a method for dynamic linking or connecting between graphic documents and comment databases using a computer system 100 with program may involve storing and selective retrieval of base graphic representations 10 that may be drawings of a project, for example, a building structure, a civil or public works project, construction of a product, and the like that may require monitoring, modification and approval during implementation. The base graphic representation 10 may be derived from converting a user supplied format graphic 12 to a web support format graphic 14, for example, converting pdf, dwf and the like vector systems or tiff, bmp and the like raster systems to swf, jpg and the like systems for Flash or like program native file capability. Descriptive or contractual text material may also be entered in the computer system 100 after conversion to a desired format.

A coordinate overlay grid 16 of a coordinate overlay program 18 may be linked to the base graphic representation 10. The coordinate overlay program 18 may have a linked data storage structure 20 or data base for overlay grid 16 position coordination and display of text records, graphics, identifiers, markup records and the like on the base graphic representation 10. The coordinate overlay program 18 may have a notation subprogram 22 linked or mapped to the coordinate overlay grid 16 to allow a user to identify a coordinate position on the coordinate overlay grid 16 with an assigned symbol or flag and identification text, such as a number code, to serve as an identifier 24 to a location for comment data records 26.

A text or graphic comment data record 26 may be entered in the data storage structure 20. The comment data records 26 may be referenced to various appropriate identifiers 24. A text or graphic comment data record 26 may then be accessed and displayed by positioning a cursor on a desired coordinate position on the base graphic representation 10 with an identifier 24 located by the coordinate overlay grid 16. The accessing and displaying may be done by using a computer mouse 50 or other cursor control device for controlling a display cursor on a display 52 of a user computer 54.

The base graphic representation 10 that may be a web support format graphic 14 form may be stored in a base graphic database DG5. Related created graphic, text and attributes information may be stored in a base graphic thumbnail image file database DG6 and a base graphic information database DG7 for user defined standard information such as name, number, date created version and the like. There may also be a user information database D11, project information database D12 and a client information database D13 having basic project information.

The user supplied format graphic 12 may be stored in a base graphic database native format file DG3 and a base graphic thumbnail image file database native format DG4.

The identifier 24 data may be stored in a symbol library database DG1 for predetermined symbols in various colors and/or shapes. The text or graphic comment data records 26 may be stored in an attached file database DC1 for repository for text or graphic files appended to individual comment records and in a markup snapshot database DG2 for repository for partial view graphic files or snapshots of user defined portions of the basic graphic representation 10.

Several databases may be controlled by the coordinate overlay program 18 for use in comments and markup such as procedural checklist database D14 for quality of review process knowledge base, standard comments database D15 for a review efficiency and uniformity knowledge base and reference material database D16 for a code and design standards knowledge base. There may also be a standard template database D17 for import of standard forms for receiving snapshots for development of supplemental documents.

The system 100 software may have a database query program module P10 to selectively search and access the various databases and to return database records pertinent to specific project activities. The system 100 software may have a third party software link program module for dynamic user interface to third party software, such as, pdf manipulation software, for example, ADOBE ACROBAT. There may be a graphic file access program module P11 to control storage and retrieval of graphic files from respective databases.

The system 100 software may also have a web conference program module P2 for interface to project defined users with the interface automated for access, a web whiteboard program module P3 for common viewing and markup of graphic files, and a notification program module P4 for automatic email notification to project specific users of hierarchy defined comment updates. There may also be a user remote identification module W1 for electronic capture of server and user computer used for access on the Internet.

There may be a thumbnail graphic image program module P5 associated with the user supplied format graphic 12 and base graphic representation 10 for control of the DG4 and DG6 databases. A graphic file conversion program module P8 may convert user supplied format graphic 12 to web support format graphic 14 and for reconversion.

The system 100 software may have a document comparison program module P6 for identification of differences between two graphic files and a file management program P7 for control of storage and retrieval of text, graphic files and stand alone program files relative to and attached to comment records. The system 100 software may also have peripheral support program modules for example, a printing program module P9. Printing subprograms and tools may allow individual or batch printing of database reports, graphic representations, base graphic representation with related identifiers and graphic overlays, review records attached and related files, documents and related graphics, and program administrative reports. Printing may be to standard electronic file formats directed to user printing hardware.

A graphic overlay representation 30 may be controlled by the coordinate overlay program 18 to be positioned intermediate the base graphic representation 10 and the coordinate overlay grid 16 on a display 52 or other device. The graphic overlay representation 30 may serve as an overlay graphic representation positioned on the base graphic representation 10 for recording markup graphics and text relative to the base graphic representation 10. Multiple graphic overlay representation on one or more base graphic representations may be linked to a single comment record. Multiple graphic overlay representations 30 may be used in a multilayer configuration. A drawing tools program module P1 may be used to control markup tools for the graphic overlay.

In use, the method and system may allow defining a graphic boundary box in the graphic overlay representation 30 that may enclose a portion of the base graphic representation 10. Graphic notes may then be entered that may be related to the base graphic representation and indexed by the coordinate overlay grid 16 by an identifier 24. Abbreviated text or graphic records may also be entered in the coordinate overlay program 18 linked data storage 20 for display on the coordinate overlay program 18 linked data storage 20 for display on the coordinate overlay grid 16. Text and/or graphic comment data records 26 may be communicated for display in a worldwide web format document for user comment data correction, for user comment additions or deletions, and for user approval or completion annotation. Review comment entry, database query and other program functions may be utilized independent of graphic interlinks.

While the invention has been particularly shown and described with respect to the illustrated embodiments thereof, it will be understood by those skilled in the art that the foregoing and other changes in form and details may be made therein without departing from the spirit and scope of the invention.

What is claimed is:

1. A system comprising:
   a computer processor;
   a non-transitory computer readable storage medium which stores programmatic instructions that, when executed by the computer processor cause the system to perform operations comprising:
   accessing a user supplied graphic corresponding to a project and enabling a corresponding graphic representation to be accessed as a web document;
   providing user access to a standard comments data store and enabling a comment to be accessed from the standard comments data store;
   enabling a user to associate a coordinate position with a graphic boundary box that encloses a portion of the graphic representation;
   recording in computer readable memory at least a graphic comment data record;
   linking a same graphic comment data record to a plurality of graphic overlay representations;
   enabling the user to:
     make a comment correction,
     add a comment, and
     delete a comment;
   enabling a graphic thumbnail to be rendered;
   selectively searching and accessing a plurality of database records and return database records;
   enabling a plurality of users to collaborate, view, and markup the graphic representation via respective interfaces;
   providing a function configured to enable differences between a first graphic file and a second graphic file to be identified; and
   communicating text and/or graphic comment data records for display in a worldwide web format,
   wherein the programmatic instructions when executed by the computer processor cause the system to transmit automatic update notifications to specific users and cause the system to import forms and enable the user to add a symbol to a coordinate position associated with the graphic representation.

2. The system as defined in claim 1, wherein the system comprises a knowledge data store configured to be utilized in providing comments with respect to a graphic document.

3. The system as defined in claim 1, wherein the system is configured with thumbnail graphic image software configured to utilize a graphic thumbnail image file data store.

4. The system as defined in claim 1, wherein the system comprises a software link program module that interfaces with third party document manipulation software.

5. The system as defined in claim 1, wherein the programmatic instructions when executed by the computer processor cause the system to to link a coordinate overlay grid to the graphic representation.

6. The system as defined in claim 1, wherein the programmatic instructions when executed by the computer processor cause the system to enable an approval and/or completion annotation to be added to a graphic document.

7. The system as defined in claim 1, wherein the programmatic instructions when executed by the computer processor cause the system to store snapshots of user defined portions of the graphic representation.

8. A computer-implemented method, the method comprising:
accessing a user supplied graphic corresponding to a project and enabling a corresponding graphic representation to be accessed as a web document;
enabling a user to associate a coordinate position with a graphic boundary box that encloses a portion of the graphic representation;
providing user access to a standard comments data store and enabling a comment to be accessed from the standard comments data store;
recording in computer readable memory at least a graphic comment data record;
linking a same graphic comment data record to a plurality of graphic overlay representations;
enabling the user to:
  add a comment, and
  delete a comment;
enabling a graphic thumbnail to be rendered;
selectively searching and accessing a plurality of data records and returning data records;
enabling a plurality of users to collaborate, view, and markup the graphic representation via respective interfaces;
providing a function configured to enable differences between a first graphic file and a second graphic file to be identified;
communicating text and/or graphic comment data records for display in a worldwide web format;
transmitting automatic update notifications to specific users;
importing forms; and
enabling the user to add a symbol to a coordinate position associated with the graphic representation.

9. The method as defined in claim 8, the method further comprising storing a thumbnail graphic image program configured to utilize a graphic thumbnail image file data store.

10. The method as defined in claim 8, the method further comprising providing a software link that interfaces with third party document manipulation software.

11. The method as defined in claim 8, the method further comprising transmitting automatic update notifications to specific users.

12. The method as defined in claim 8, the method further comprising linking a coordinate overlay grid to the graphic representation.

13. The method as defined in claim 8, the method further comprising providing user access to a standard comments data store and enabling a comment to be accessed from the standard comments data store.

14. The method as defined in claim 8, the method further comprising storing snapshots of user defined portions of the graphic representation.

15. A non-transitory computer readable storage medium which stores programmatic instructions that, when executed by a computer processor cause the computer processor to perform operations comprising:
access a user supplied graphic corresponding to a project and enable a corresponding graphic representation to be accessed as a web document;
enable a user to associate a coordinate position with a graphic boundary box that encloses a portion of the graphic representation;
provide user access to a standard comments data store and enabling a comment to be accessed from the standard comments data store;
record in compute readable memory at least a graphic comment data record;
link a same graphic comment data record to a plurality of graphic overlay representations;
enable the user to:
  add a comment,
  delete a comment, and
  add an approval annotation;
enable a graphic thumbnail to be rendered;
selectively search and access a plurality of database records and return data records;
enable a plurality of users to collaborate, view, and markup the graphic representation via respective interfaces;
provide a function configured to enable differences between a first graphic file and a second graphic file to be identified;
communicate text and/or graphic comment data records for display in a worldwide web format;
transmitting automatic update notifications to specific users;
import forms; and
enable the user to add a symbol to a coordinate position associated with the graphic representation.

16. The non-transitory computer readable storage medium as defined in claim 15, the operations further comprising storing thumbnail graphic image software configured to utilize a graphic thumbnail image file data store.

17. The non-transitory computer readable storage medium as defined in claim 15, the operations further comprising providing a software link that interfaces with third party document manipulation software.

18. The non-transitory computer readable storage medium as defined in claim 15, the operations further comprising transmitting automatic update notifications to specific users.

19. The non-transitory computer readable storage medium as defined in claim 15, the operations further comprising linking a coordinate overlay grid to the graphic representation.

20. The non-transitory computer readable storage medium as defined in claim 15, the operations further comprising linking a same graphic comment data record to a plurality of graphic overlay representations.

21. The non-transitory computer readable storage medium as defined in claim 15, the operations further comprising storing snapshots of user defined portions of the graphic representation.

* * * * *

UNITED STATES PATENT AND TRADEMARK OFFICE
CERTIFICATE OF CORRECTION

PATENT NO. : 11,868,703 B2
APPLICATION NO. : 18/166345
DATED : January 9, 2024
INVENTOR(S) : Michael M. Chegini Page 1 of 1

It is certified that error appears in the above-identified patent and that said Letters Patent is hereby corrected as shown below:

On the Title Page

Column 1, (Applicant), Line 1: Delete "Ivine," and insert -- Irvine, --.

On Page 2, Column 2, (U.S. Patent Documents), Line 27: Delete "Lyangar" and insert -- Iyangar --.

In the Drawings

On Sheet 1 of 1, (Reference Numeral 30), (FIG. 1), and on the Title Page, the illustrative print figure, Line 2: Delete "REPRESETATION" and insert -- REPRESENTATION --.

In the Claims

On Column 5, Line 13 (Approx.): In Claim 5, delete "to to" and insert -- to --.

Signed and Sealed this
Eighth Day of October, 2024

Katherine Kelly Vidal
*Director of the United States Patent and Trademark Office*